S. C. COOPER & W. M. AUSTIN.
TROLLEY POLE SUPPORTING AND CUSHIONING MEANS.
APPLICATION FILED MAY 3, 1907.
917,714.
Patented Apr. 6, 1909.
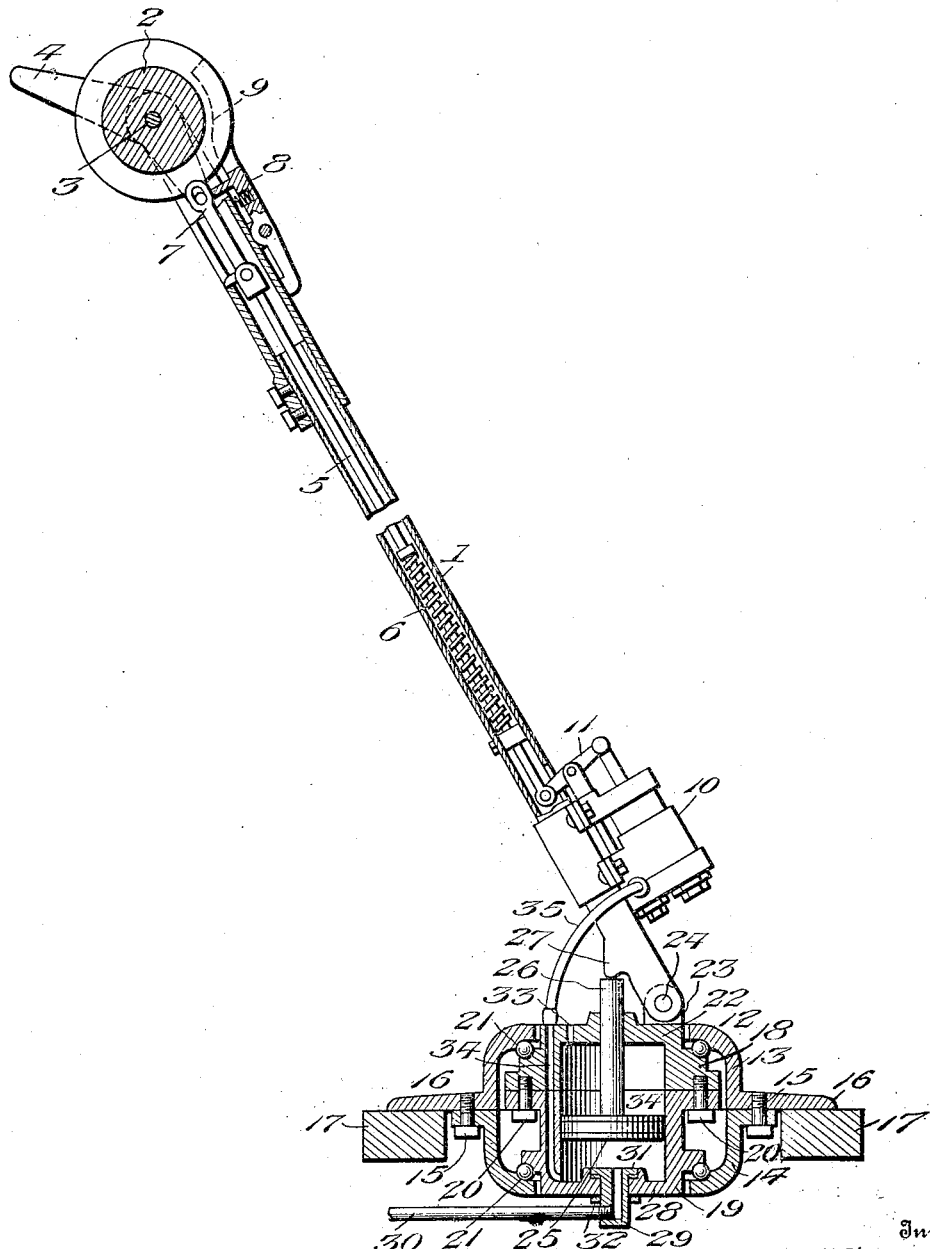

UNITED STATES PATENT OFFICE.

SAMUEL C. COOPER, OF JOHNSTOWN, NEW YORK, AND WALTER M. AUSTIN, OF SWISSVALE, PENNSYLVANIA, ASSIGNORS, BY DIRECT AND MESNE ASSIGNMENTS, OF ONE-THIRD TO SAID COOPER, ONE-THIRD TO PHILIP KECK, AND ONE-THIRD TO SIDNEY E. TRUMBULL, OF JOHNSTOWN, NEW YORK.

TROLLEY-POLE SUPPORTING AND CUSHIONING MEANS.

No. 917,714.      Specification of Letters Patent.      Patented April 6, 1909.

Application filed May 3, 1907. Serial No. 371,761.

*To all whom it may concern:*

Be it known that we, SAMUEL C. COOPER, a citizen of the United States, residing at Johnstown, in the county of Fulton and State of New York, and WALTER M. AUSTIN, a citizen of the United States, residing at Swissvale, in the county of Allegheny and State of Pennsylvania, have invented new and useful Improvements in Trolley-Pole Supporting and Cushioning Means, of which the following is a specification.

This invention relates to a trolley pole supporting and cushioning mechanism whereby the trolley is maintained in operative relation with the overhead conductor, and the transmission of shocks and vibrations to the car body through the trolley pole effectively eliminated.

The invention has for one of its objects to provide a mechanism of the character referred to in which compressed air from the air brake reservoir on the car is employed for maintaining the trolley pole in its operative position, and for serving as a cushioning device for preventing shocks and vibrations from being transmitted to the body of the car. In this connection, it will be remarked that it has been found by experiment that the vibration of the car is due to a considerable extent to the shocks and movement of the trolley pole following along under the trolley wire and by providing a cushioning means between the trolley pole and bottom of the base, better running of the car is insured.

A further object of the invention is the provision of a trolley pole having an automatic replacer and a resetting motor, in combination with a motor for maintaining the trolley pole in operative relation, said motors being actuated from a common source of fluid pressure.

A still further object is the employment of a simple and substantial supporting base whereby the trolley pole can be rotated on a vertical axis, and which base includes a shock-absorbing or cushioning device having the additional function of holding the pole with the trolley in operative relation with the overhead wire, the rotatable element of the supporting base serving to permit the trolley pole to freely swing laterally to follow bends and unevenness in the overhead wire, in the tracks and roadbed.

Another object of the invention is to improve and simplify the construction and operation of devices of the character referred to so as to be comparatively easy and inexpensive to manufacture and install, readily controllable, and highly efficient and reliable in service.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, the figure represents a combined vertical section in side elevation of the trolley pole supporting and cushioning device, shown in connection with a trolley pole equipped with an automatic replacer and resetting motor therefor.

In the present instance, we have elected to illustrate the combined trolley pole supporting and cushioning device in connection with a trolley pole equipped with an automatic replacer and re-setting motor that constitutes the subject-matter of our copending application for Letters Patent, Serial No. 371,717, filed May 3, 1907, and while the present invention is admirably adapted for use in combination with the trolley pole mentioned, it is to be understood that the combined pole supporting and cushioning device is not necessarily limited thereto, since it can be employed in connection with ordinary trolley poles with excellent results. In order, however, to correlate the present invention with the subject-matter of our co-pending application, the latter will be briefly described in connection with the accompanying drawing. The hollow trolley pole 1 is provided at its upper end with the usual grooved trolley wheel 2 and is hingedly mounted at its lower end. Fulcrumed on the axle 3 of the trolley wheel is a frame having oppositely and outwardly inclined lips or arms 4 to constitute a replacer, the arms being automatically projected by a motor composed of a rod 5 mounted for longitudinal movement upon the pole 1 and moved in one direction by a spring 6.

Between the operating rod 4 and trolley replacer is a toggle link connection designated generally by 7 which is adapted to be broken or collapsed by an actuator 8 mounted on the trolley pole harp and having arms 9 disposed so as to be engaged by the trolley wire, when the wheel 2 becomes displaced from the latter. It will thus be seen that the replacing device is thrown automatically into operation, and in order to return the parts to normal position, a pneumatic motor is suitably attached on the trolley pole with its movable element or piston connected by a lever 11 with the rod 5, whereby the latter is moved in a direction to straighten the links or arms of the toggle device 7, and thus restore the parts to initial position.

Referring now more particularly to the subject-matter of the present invention in one specific form, 12 designates the casing or housing of the trolley pole base which is preferably composed of two sections 13 and 14 divisible on a horizontal plane and secured together by bolts 15 or other suitable means. The upper section 13 is cast with laterally extending lugs 16 to support the casing 12 on the roof of the car, of which only two cross pieces 17 are shown. Within the casing is a vertical cylinder composed of two sections 18 and 19 that are also divisible on a horizontal plane and secured by bolts 20, and the cylinder is mounted to rotate on a vertical axis by means of two ball bearings 21 between the ends of the cylinder and casing. On the top head 22 of the cylinder or rotatable element of the pole supporting base are lugs 23 for receiving a bolt 24 passing through the lower end of the trolley pole for hingedly connecting the latter with the said cylinder or element. Within the cylinder is a piston 25 having a rod or stem 26 extending upwardly through the head 22 for engaging at its extremity a rounded projection 27 on the trolley pole. This piston and cylinder, which constitute a pneumatic motor and cushioning device for the downward thrusts of the trolley pole, is supplied with compressed air from the reservoir of the air brake equipment of the car and the supply of air can be controlled by the motorman or from either end of the car in any suitable manner. In the bottom head 28 of the cylinder is a nipple 29 that has connection with the compressed air supply pipe 30. Since the supply pipe is stationary, the nipple or coupling 29 is mounted to afford a swivel movement. For this purpose, the coupling or nipple is arranged coincident with the axis of the cylinder and is held in place by an annular flange 31 engaging the inside of the head 28 and a nut 32 engaging the under side of the head. By this means, leakage of air is prevented and the cylinder and trolley pole can move together when it is desired to change the position of the trolley. During normal operation, air under pressure is constantly maintained on the under side of the piston 25 so as to urge the trolley pole in a direction to keep the wheel 2 in running engagement with the overhead wire and the power exerted by the piston or movable element of the motor can be readily controlled by varying the air pressure from the car platform or other suitable point. To insure free working of the piston 25, the upper head of the cylinder is provided with a vent 33, thus preventing a dash-pot action of the piston.

Since the air pressure is maintained in the cylinder space below the piston 25, as long as the parts are in normal working position, the compressed air necessary for the operation of the resetting motor 10 of the trolley replacing mechanism, may be taken from the cylinder. For this purpose, the walls of the cylinder sections 18 and 19 are provided with a passage 34 consitituting a by-pass, and between the outer end of the by-pass and motor is a flexible conduit 35 for permitting air to be supplied from the air brake system of the car to the pole-supporting motor and re-setting motor simultaneously and in series relation.

In practice, the trolley pole is normally supported in the usual position with respect to the car and overhead wire, and by properly reducing the air pressure between the reservoir of the brake equipment and the cylinder in the casing 12, the trolley can be maintained in engagement with the overhead wire with the requisite pressure. Since this pressure can be readily controlled from the car platform or other suitable points, the contact of the under-run trolley with the current supply wire can be regulated to a nicety. Whenever the trolley attempts to leave the wire, the replacing device is immediately called into play and the ready supply of compressed air or motor fluid will quickly restore the replacer to normal position through the medium of the motor 10. Since the motor agency under the piston 25 is elastic, an effective cushioning or shock-absorbing device is provided, whereby the sudden movements and shocks imparted to the trolley pole are prevented from having any perceptible effect upon the car body and producing vibration. Whenever it is desired to drop the trolley pole, the air pressure is cut off from the pipe 30, whereupon the trolley pole and attached parts will gradually swing downwardly on the hinge 24, the air entrapped in the space below the piston 25 serving to permit the parts to fall gradually.

From the foregoing description, taken in connection with the accompanying drawing, the advantages of the construction and of the method of operation will be readily apparent to those skilled in the art to which the invention appertains, and while we have described the principle of operation of the invention, together with the apparatus which we now consider to be the best embodiment thereof, we desire to have it understood that the apparatus shown is merely illustrative and that such changes may be made when desired, as are within the scope of the claims.

Having thus described the invention, what we claim is:—

1. The combination of a trolley pole, a mounting therefor including a pneumatic means for holding the pole in raised position, with a trolley replacing device, means for automatically projecting the device to replace the trolley, pneumatic means for restoring the said projecting means.

2. The combination of a trolley pole and a fluid pressure device for holding the pole in raised position, with a replacing mechanism, mechanism for projecting the replacing device, a fluid pressure motor for restoring said mechanism, and means for supplying fluid under pressure to the said pole-receiving device and motor.

3. The combination of a trolley pole, a fluid actuated means arranged when under fluid pressure to raise the pole and maintain it in raised position and adapted to permit the pole to lower by its own weight when the pressure is removed, with a trolley replacing device, a spring-actuated means for projecting said device, fluid pressure actuated resetting mechanism for the replacing device, and means for supplying fluid under pressure to the said means and mechanism.

4. The combination of a trolley pole, with a replacing mechanism, a fluid pressure device for said mechanism, and a second fluid pressure device forming the sole means for holding the pole in normal position.

5. The combination of a trolley pole, with a replacing mechanism, a fluid pressure motor mounted on and movable with the pole for actuating the replacing mechanism, a fluid pressure device forming the sole means for holding the pole in normal position, and a common source of fluid pressure for the said motor and device.

6. The combination of a trolley pole, with a cylinder on which the pole is mounted, a piston in the cylinder, means for admitting fluid pressure under the piston for holding the pole in normal position and for absorbing shocks, and trolley-replacing mechanism on the pole, a motor for the mechanism, and means for supplying fluid under pressure from the under side of the said piston to the motor.

7. The combination of a trolley pole, a trolley thereon, replacing elements mounted on the pole adjacent the trolley, an actuating member, a toggle connection between the elements and member, means operated by the overhead wire for breaking the toggle joint, a fluid actuated motor connected with the said member, with a fluid actuated device for raising the pole and maintaining it in raised position, and means for supplying fluid under pressure to the device and motor.

8. The combination of a trolley wheel, a replacing device, an actuating rod, a toggle connection between the rod and device, means for breaking the toggle connection, means arranged to operate through the rod to project the replacing device when the toggle connection is broken, fluid-actuated means connected with the rod for straightening the toggle connection, with a mounting for the trolley pole, a cylinder in the mounting, a piston in the cylinder, means for supplying fluid under pressure to the cylinder, and means for supplying fluid to the motor.

9. The combination of a cylinder composed of two parts divisible on a horizontal plane and arranged with its axis vertically, a piston arranged in the cylinder, a rod rising from the piston and projecting out of the top head of the cylinder, a trolley pole movably resting on the upper end of the piston rod, a hinge joint between the lower extremity of the pole and top of the cylinder and arranged in front of the piston rod, a frame in which the cylinder is mounted for rotation, and means for connecting the lower end of the cylinder with a source of fluid under pressure.

10. The combination of a cylinder arranged with its axis vertical and having upper and lower heads, each head having a central opening, a piston movable in the cylinder, a rod rigidly secured to the piston and extending slidably through the opening of the top head, a trolley pole hingedly connected with the top of the cylinder at a point in front of the piston rod, an abutment on the trolley pole slidably bearing on the top end of the piston rod, a hollow connecting piece arranged in the opening of the bottom head, a pipe connected with the said piece for supplying fluid under pressure to the cylinder, and a frame for supporting the cylinder on the roof of a car and in which the cylinder is mounted for rotation.

11. The combination of a frame composed of two parts divisible on a horizontal plane, a vertically-disposed cylinder housed within the frame, ball bearings between the ends of the cylinder and frame for rotatably supporting the cylinder in the frame and preventing vertical movement of the cylinder, said cylinder having central openings in the top and bottom heads thereof, a connecting piece mounted in the lower opening and projecting out of the same, a pipe secured to the said piece and holding the same stationary, a piston on the cylinder, a rod secured to the piston and slidable back and forth in the opening of the upper head, and a trolley pole secured to the cylinder and resting on the upper end of the rod to be raised and lowered by the latter.

12. The combination of a trolley pole, a two-part mounting in the form of a housing, a two-part cylinder therein, anti-friction bearings between the cylinder and housing, a piston within the cylinder, a hinged connection between the trolley pole and one end of the cylinder, a swiveled nipple or coupling arranged axially in one head of the cylinder, and a motive fluid supply pipe connected with the coupling.

In testimony whereof, we affix our signatures in presence of two witnesses.

SAMUEL C. COOPER.
    WALTER M. AUSTIN.

Witnesses:
 W. N. WOODSON,
 C. BRADWAY.